United States Patent [19]

Connell

[11] Patent Number: 5,765,957
[45] Date of Patent: Jun. 16, 1998

[54] LOCKABLE TURNBUCKLE ASSEMBLY

[75] Inventor: John Aaron Connell, Kent, Wash.

[73] Assignee: The Boeing Company, Seattle, Wash.

[21] Appl. No.: 767,174

[22] Filed: Dec. 16, 1996

[51] Int. Cl.$^6$ ........................................................ F16B 7/06
[52] U.S. Cl. ........................................................ 403/46; 403/44
[58] Field of Search ................................ 403/43, 44, 45, 403/46, 47, 48, 320

[56] References Cited

U.S. PATENT DOCUMENTS

| | | | |
|---|---|---|---|
| 1,374,963 | 4/1921 | Stevenson | 403/44 |
| 2,678,225 | 5/1954 | Wright | 287/60 |
| 2,816,783 | 12/1957 | Robertson | 403/44 |
| 3,239,930 | 3/1966 | Violleau | 29/516 |
| 4,418,935 | 12/1983 | O'Connor | 403/46 X |
| 4,778,194 | 10/1988 | Koch et al. | 280/461 A |
| 5,358,524 | 10/1994 | Richelsoph | 403/46 X |

Primary Examiner—Thomas R. Hannon
Attorney, Agent, or Firm—William C. Anderson

[57] ABSTRACT

A lockable turnbuckle assembly having a locking mechanism that can be used in limited space applications. The present invention pertains to a turnbuckle that is adjustable and lockable using a single hand and does not require the use of tools.

4 Claims, 4 Drawing Sheets

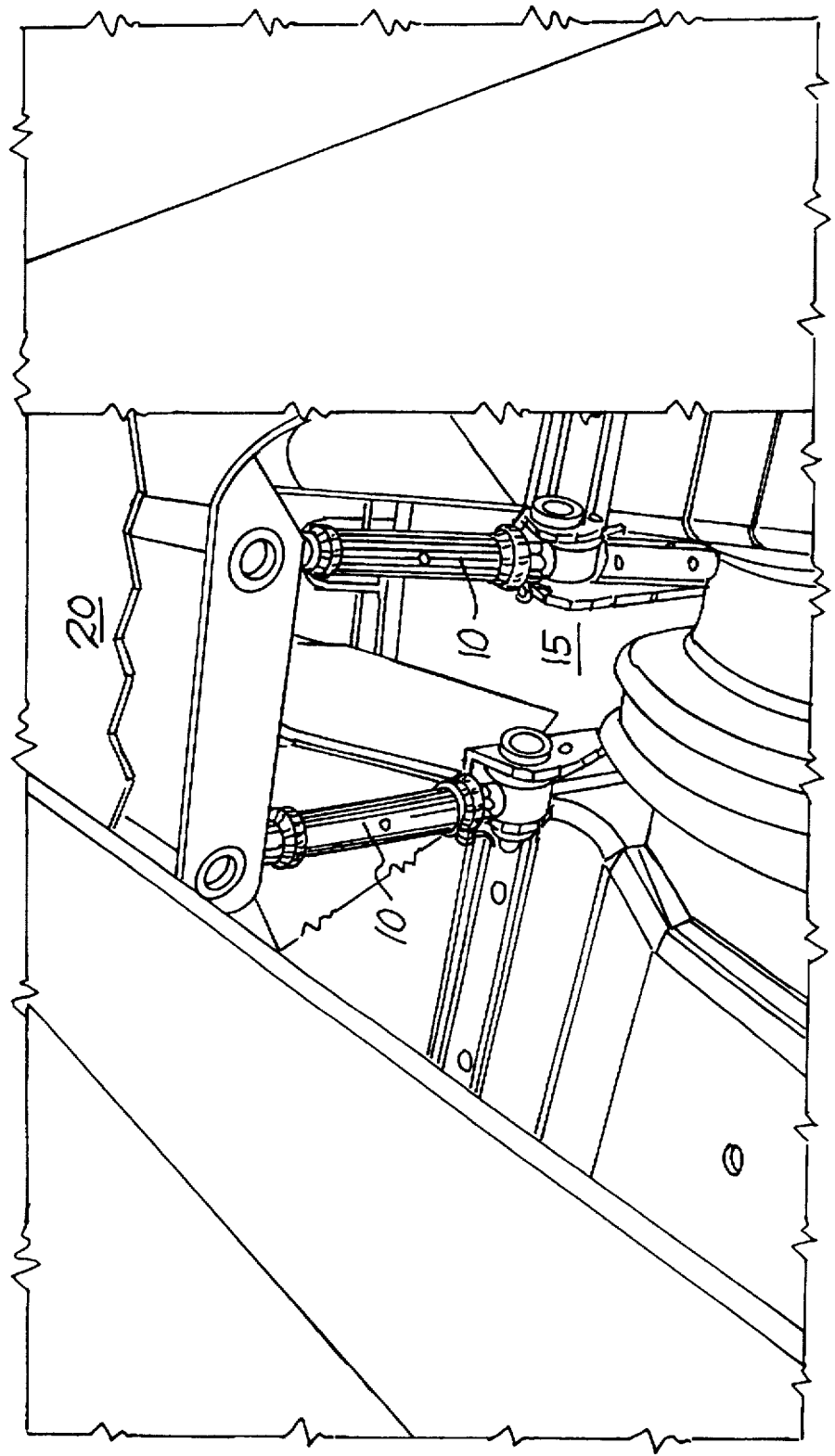

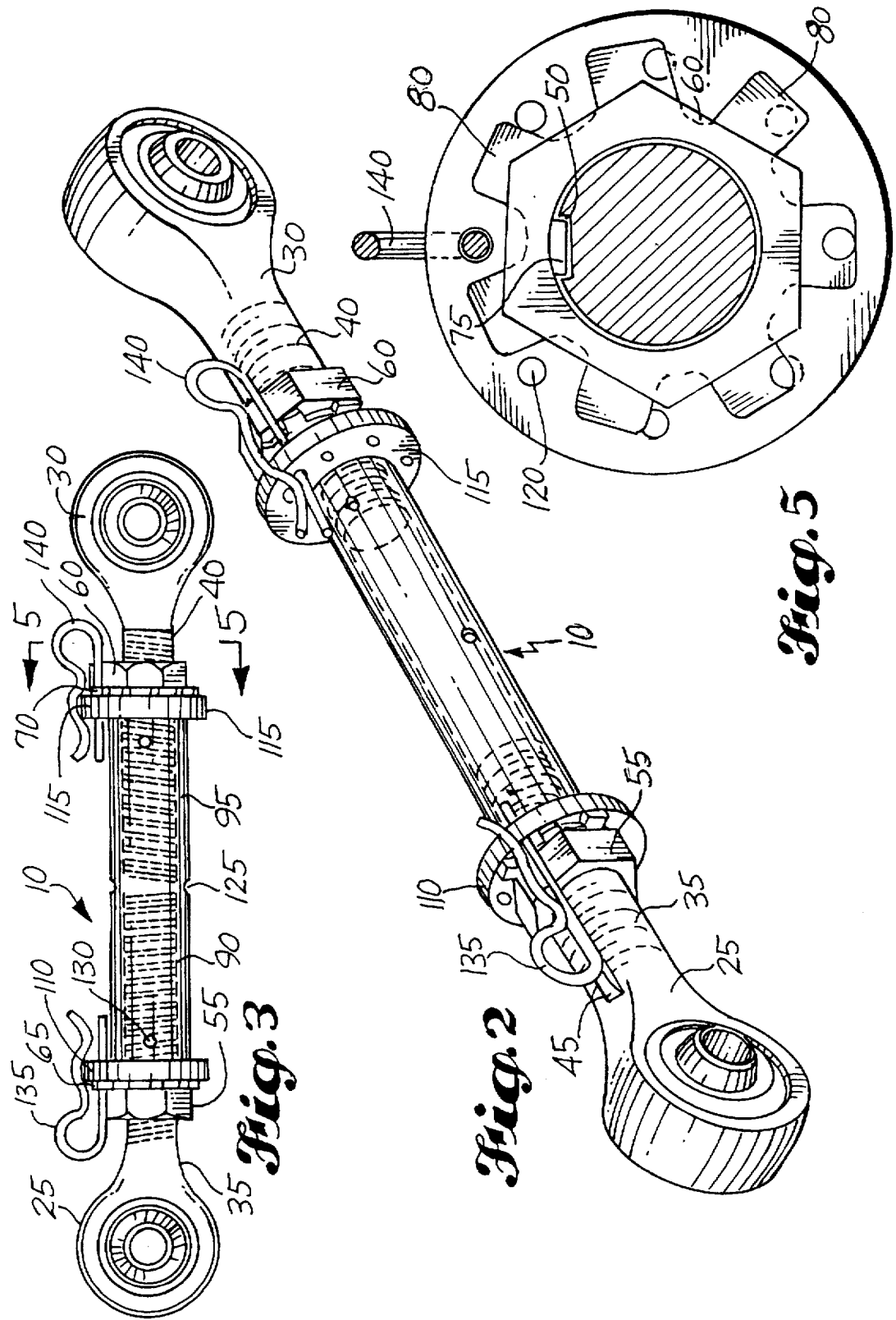

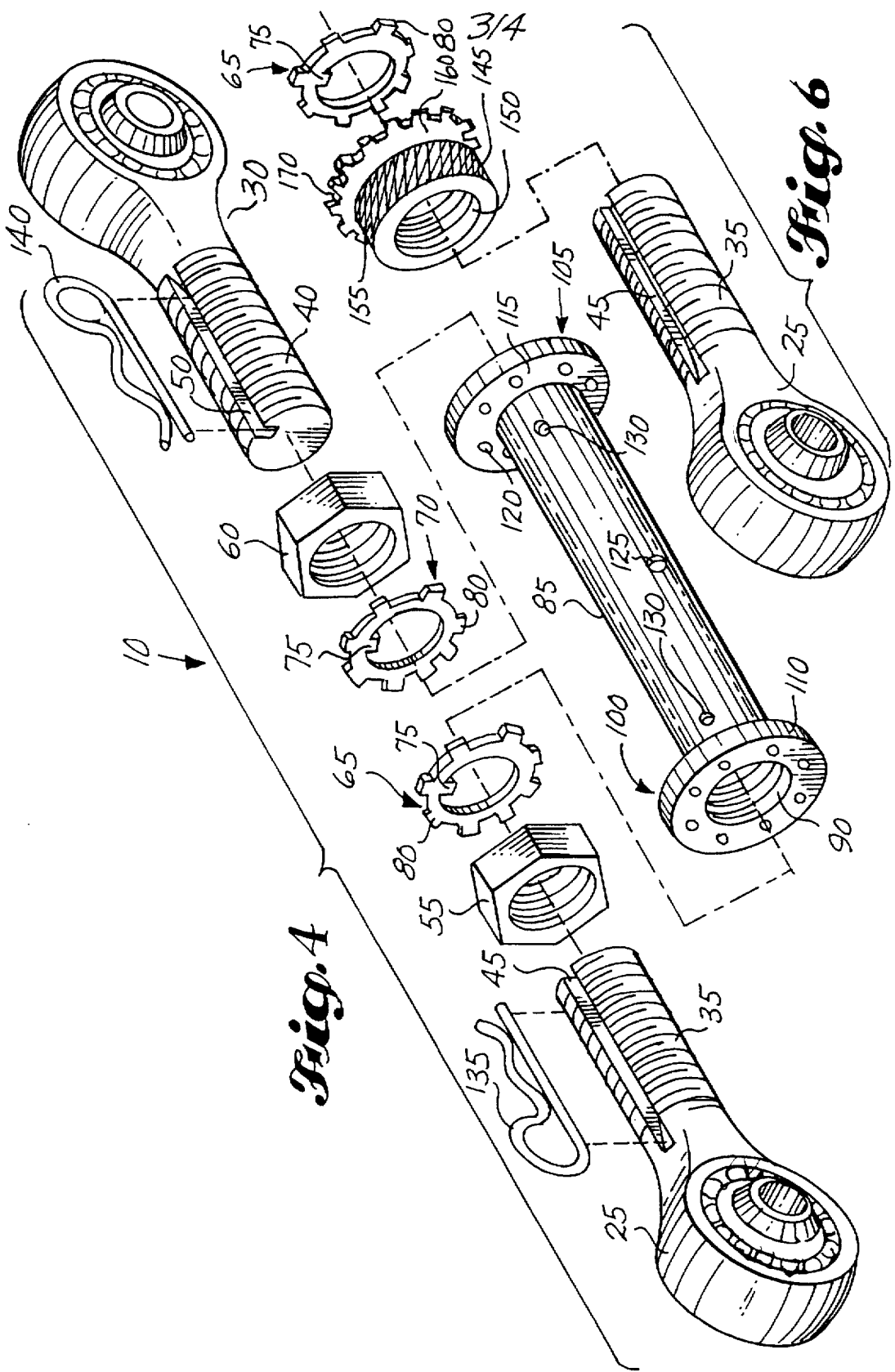

1

LOCKABLE TURNBUCKLE ASSEMBLY

FIELD OF THE INVENTION

This invention is related to locking turnbuckle assemblies. More particularly the instant invention is related to turnbuckles having a locking mechanism that can be used in limited space applications. Still more particularly, the present invention pertains to a turnbuckle that is single-hand adjustable and lockable and does not require the use of tools.

BACKGROUND OF THE INVENTION

Turnbuckles are well known in the art. They have been used in a number of non-aerospace and aerospace applications. For example, a plurality of lockable turnbuckles and their associated cables have been mounted within the small confines of a wing of an airplane. An example of such a turnbuckle is shown in U.S. Pat. No. 2,678,225, issued May 11, 1954, to Wright.

However, usually locking turnbuckles, such as those described by Wright, require two hands to tighten jam nuts and/or install a lockwire. Other turnbuckles have used tanged washers wherein one tang must be bent over a jam nut and another tang bent to a rod. Typically, tools are required for both installation and removal of known turnbuckles.

SUMMARY OF THE INVENTION

An object of this invention is to provide an adjustable turnbuckle assembly having a locking feature that can be used in confined spaces.

Another object of this invention is the provision of a lockable turnbuckle assembly that can be locked into place with one hand.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein:

FIG. 1 generally illustrates the present turnbuckle assembly in a confined space located within the wing box of a commercial airplane.

FIG. 2 is an isometric view of one embodiment of the instant turnbuckle assembly invention.

FIG. 3 is a side view of the turnbuckle assembly of FIG. 2.

FIG. 4 is an exploded isometric view of the instant turnbuckle assembly of the present invention.

FIG. 5 is an enlarged end view of the turnbuckle assembly of FIG. 3 taken along lines 5—5.

FIG. 6 illustrates an alternative embodiment of a jam nut of the present invention.

DETAILED DESCRIPTION OF THE PREFERRED EMBODIMENT

Figure 8:
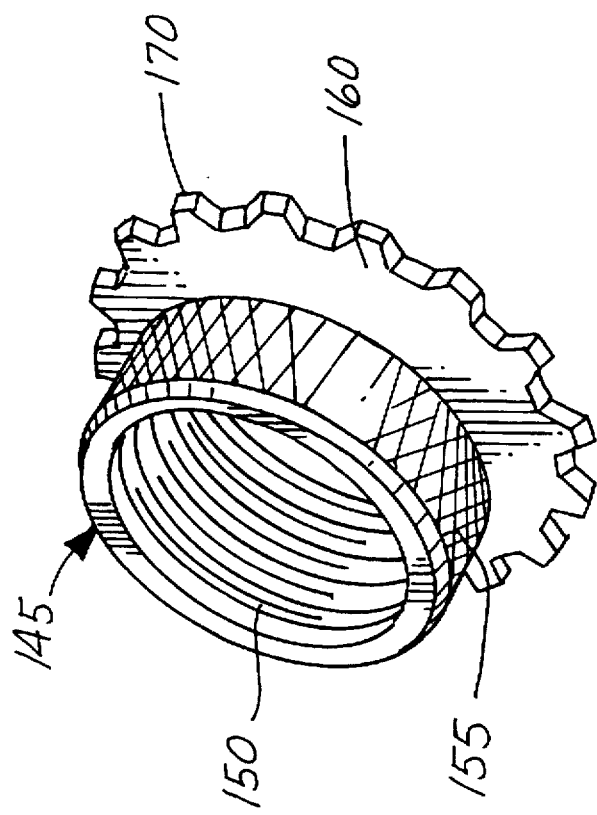
FIG. 8 depicts an isolated isometric view of the jam nut of FIG. 6.

Referring now to FIG. 1, a lockable turnbuckle assembly 10 of the present invention is shown disposed in a confined space 15 positioned below the wing box lower panel 20 of a commercial airplane (not shown). In FIG. 1, the turnbuckle assembly 10 is used to affixedly position certain components within the confined space 15. A turnbuckle assembly of the present invention is particularly useful in such confined spaces. More particularly, due to the difficulty of moving about and within the space 15, it is important to be able to adjust and lock the turnbuckle assembly with one hand. It is also preferable to do so without the use of any tools.

These requirements are satisfied with the instant lockable turnbuckle assembly 10. More particularly, the present assembly 10 comprises a left rod end 25 and a right rod end 30. As perhaps best shown in FIGS. 2, 3 and 4, left rod end 25 is provided with a left hand thread 35 and the right rod end 30 is provided with a right hand thread 40. Each of the rod ends 25 and 30 are provided with keyways 45 and 50, respectively which extend along the length of the rod ends 25 and 30.

A left and a right jam nut 55 and 60 is used on the left rod end 25 and right rod end 30, respectively. The left jam nut 55 has a complementary left hand thread for mating with the left hand thread 35. In contrast, the right jam nut has a right hand thread which agrees with the right hand thread 40 of the right rod end 30.

A left end flat washer 65 and an identical right end flat washer 70 are each keyed as at 75 to mate with the left end rod keyway 45 and the right end rod keyway 50, respectively. Each washer 65 and 70 are provided with a plurality of tangs 80.

A unique turnbuckle housing 85 of the present invention comprises left hand internal threads 90 and right hand internal threads 95 disposed at its left and right ends 100, 105, respectively. Also disposed at the left and right ends 100, 105 of the housing 85 is a left and right end flange 110, 115, respectively. Each of the flanges 110 and 115 are provided with a plurality of lock pin holes 120 perhaps best seen in FIGS. 2, 4, and 5. A wrenching hole 125, useful for turning the housing 85 with an optional conventional tool (not shown) and rod-end witness holes 130 complete the housing 85.

The left and right end flanges 110, 115 of the turnbuckle assembly 10 each have at least one more or one less lock pin holes 120, i.e., a number different than the number of tangs 80 on each flat keyed washer 65 and 70. This ensures that at least one hole 120 on the flanges 110, 115 will not be covered by a tang 80 when either the left end jam nut 55 or the right end jam nut 65 is tightened against the flanges 110 and 115, respectively. FIG. 5, more particularly, shows this unique feature of the present invention.

When the turnbuckle assembly 10 has been affixed in its intended adjusted position within the confined space 15, an installer tightens each jam nut 60, 65 by hand and inserts a left or a right lock or hitch pin 135, 140, respectively, in one of the readily accessible lock pin holes 120 disposed in the left and right end flanges 110, 115, respectively. The hitch pins 135 and 140 are used to prevent rotation of the jam nuts 55 and 60 and turnbuckle housing 85 after they have been torqued against each other. The pins 135, 140 may be installed as shown in FIGS. 2, 3, and 4 or from the opposite side of left end and right end flange 115, 120, respectively or any combination thereof. Note in FIG. 2 that the left lock or hitch pin 135 is shown partially inserted into the lock pin hole 120 in the left end flange 110.

The tangs 80, the left end and right end washer key 75, the left end rod keyway 45, the right end rod keyway 50, the left end jam nut 55, the right end jam nut 60, the left end washer 65 and the right end washer 70, the left lock or hitch pin 135 and the identical right lock or hitch pin 140, comprise the locking structure or mechanism of the present turnbuckle assembly.

Figure 7:
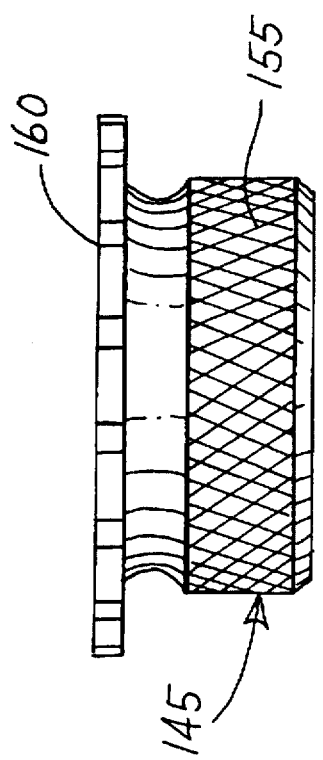
FIG. 7 shows a side view of the alternative jam nut of FIG. 6.

FIGS. 6, 7, and 8 illustrate an alternative form of a locking structure of the present invention wherein another embodiment of a jam nut is depicted, for convenience only, as a left end cylindrical jam nut 145. Jam nut 145 comprises left hand threads 150, an upper body that is knurled as at 155 to facilitate finger tightening, and an integral flange 160. The flange 160 is provided with a plurality of teeth 170 which extends outwardly from the knurled upper body 155 towards the lock pin holes 120. The number of teeth 170 is equal to or different than the number of lock pin holes 120 shown on the right hand flange 115 to facilitate the insertion of a hitch pin (not shown) once the turnbuckle assembly has been adjusted and is to be locked into position. The number of teeth is determined by the amount of tightening required once the left end cylindrical jam nut 145 contacts the left end flat washer 65 and left end flat washer 65 contacts left end flange 110. The maximal number of teeth 170 are spaced a minimum of the hole diameter of the lock pin hole 120. In use, a hitch pin is inserted into the available lock pin hole 120. This design insures that the cylindrical jam nut 145 does not vibrate loose in a high vibration environment.

As will be obvious to one of ordinary skill in the art a jam nut 145 having a right hand thread to agree with the right rod end may also be used. Alternatively, a jam nut of the type described as either the left end jam nut 55 or the right end jam nut 60 may be mixed with a left or a right end cylindrical jam nut 145.

Finally, in use, in either embodiment, prior to insertion of the left or right lock pin 135, 140, respectively, the turn buckle housing 85 may be optionally rotated so as to further tighten the left end and right end jam nuts 55, 60 respectively.

While the principles of this invention have been described in connection with specific embodiments, it should be understood clearly that these descriptions are made only by way of example and are not intended to limit the scope of the invention.

What is claimed:

1. A lockable turnbuckle assembly comprising:
   a. a cylindrical housing having left and right handed internal threading, said housing having a flange positioned at each of its distal ends; each of said flanges being provided with a plurality of lock pin holes;
   b. a left and a right rod end, said left rod end comprising left handed external threading which agrees with the threading of said left handed internal threading of said housing, said right rod end comprising right handed external threading which agrees with the threading of said right handed internal threading of said housing, said left and said right rod end further comprising a keyway extending along the length of each of said left and said right rod ends;
   c. a left end jam nut having internal threading which agrees with said left handed external threading of said left rod end and a right end jam nut having internal threading which agrees with said right handed external threading of said right rod end;
   d. a left end flat washer and a right end flat washer, each of said washers having a key which mates with said keyway extending along the length of each of said left and said right rod ends, each of said washers further comprising a plurality of tangs, the number of said plurality of tangs being different than the number of said plurality of lock pin holes, and
   e. a lock pin for inserting into one of said lock pin holes in each of said flanges whereby said left end jam nut and said right end jam nut may be fixed in an appropriate position.

2. A lockable turnbuckle assembly comprising:
   a. a cylindrical housing having left and right handed internal threading, said housing having a flange positioned at each of its distal ends; each of said flanges being provided with a plurality of lock pin holes;
   b. a left and a right rod end, said left rod end comprising left handed external threading which agrees with the threading of said left handed internal threading of said housing, said right rod end comprising right handed external threading which agrees with the threading of said right handed internal threading of said housing, said left and said right rod end further comprising a keyway extending along the length of each of said left and said right rod ends;
   c. a left end jam nut having internal threading which agrees with said left handed external threading of said left rod end and a right end jam nut having internal threading which agrees with said right handed external threading of said right rod end, said left end jam nut having a cylindrical outer body, said outer body having a knurled outer surface for facilitating finger tightening of said cylindrical jam nut, and an integral flange extending outwardly from said outer body towards said plurality of lock pin holes, said integral flange being provided with a plurality of teeth capable of being positioned proximate said lock pin holes, and wherein the number of said teeth being equal to or different than the number of said lock pin holes;
   d. a left end flat washer and a right end flat washer, each of said washers having a key which mates with said keyway extending along the length of each of said left and said right rod ends, each of said washers further comprising a plurality of tangs, the number of said plurality of tangs being different than the number of said plurality of lock pin holes, and
   e. a lock pin for inserting into one of said lock pin holes in each of said flanges whereby said left end jam nut and said right end jam nut may be fixed in an appropriate position.

3. A lockable turnbuckle assembly comprising:
   a. a cylindrical housing having left and right handed internal threading, said housing having a flange positioned at each of its distal ends; each of said flanges being provided with a plurality of lock pin holes;
   b. a left and a right rod end, said left rod end comprising left handed external threading which agrees with the threading of said left handed internal threading of said housing, said right rod end comprising right handed external threading which agrees with the threading of said right handed internal threading of said housing, said left and said right rod end further comprising a keyway extending along the length of each of said left and said right rod ends;
   c. a left end jam nut having internal threading which agrees with said left handed external threading of said left rod end and a right end jam nut having internal threading which agrees with said right handed external threading of said right rod end, said right end jam nut having a cylindrical outer body, said outer body having a knurled outer surface for facilitating finger tightening of said cylindrical jam nut, and an integral flange extending outwardly from said outer body towards said plurality of lock pin holes, said integral flange being provided with a plurality of teeth capable of being positioned proximate said lock pin holes, and wherein the number of said teeth being equal to or different than the number of said lock pin holes;

d. a left end flat washer and a right end flat washer, each of said washers having a key which mates with said keyway extending along the length of each of said left and said right rod ends, each of said washers further comprising a plurality of tangs, the number of said plurality of tangs being different than the number of said plurality of lock pin holes, and e. a lock pin for inserting into one of said lock pin holes in each of said flanges whereby said left end jam nut and said right end jam nut may be fixed in an appropriate position.

4. A lockable turnbuckle assembly comprising:

a. a cylindrical housing having left and right handed internal threading, said housing having a flange positioned at each of its distal ends; each of said flanges being provided with a plurality of lock pin holes;

b. a left and a right rod end, said left rod end comprising left handed external threading which agrees with the threading of said left handed internal threading of said housing, said right rod end comprising right handed external threading which agrees with the threading of said right handed internal threading of said housing, said left and said right rod end further comprising a keyway extending along the length of each of said left and said right rod ends;

c. a left end jam nut having internal threading which agrees with said left handed external threading of said left rod end and a right end jam nut having internal threading which agrees with said right handed external threading of said right rod end, each of said jam nuts having a cylindrical outer body, said outer body having a knurled outer surface for facilitating finger tightening of said cylindrical jam nut, and an integral flange extending outwardly from said outer body towards said plurality of lock pin holes, said integral flange being provided with a plurality of teeth capable of being positioned proximate said lock pin holes, and wherein the number of said teeth being equal to or different than the number of said lock pin holes, and d. a left end flat washer and a right end flat washer, each of said washers having a key which mates with said keyway extending along the length of each of said left and said right rod ends, each of said washers further comprising a plurality of tangs, the number of said plurality of tangs being different than the number of said plurality of lock pin holes, and e. a lock pin for inserting into one of said lock pin holes in each of said flanges whereby said left end jam nut and said right end jam nut may be fixed in an appropriate position.

* * * * *